United States Patent [19]

Berger

[11] Patent Number: 4,857,244

[45] Date of Patent: Aug. 15, 1989

[54] PROCESS OF MAKING A COMPOSITE PRODUCT, ESPECIALLY A VEHICLE TIRE

[75] Inventor: Michel Berger, Castelnau-de-Medoc, France

[73] Assignee: Pradom Limited, London, United Kingdom

[21] Appl. No.: 27,793

[22] Filed: Mar. 19, 1987

Related U.S. Application Data

[63] Continuation-in-part of Ser. No. 777,622, Sep. 19, 1985, Pat. No. 4,707,231.

[30] Foreign Application Priority Data

| Sep. 26, 1984 [FR] | France | 84 14800 |
| Jan. 23, 1987 [FR] | France | 87 00797 |
| Feb. 18, 1987 [FR] | France | 87 02106 |
| Feb. 18, 1987 [FR] | France | 87 02105 |

[51] Int. Cl.$^4$ ............... B29B 15/08; B29C 35/02; B29C 43/18
[52] U.S. Cl. .................... 264/24; 264/26; 264/108; 264/137; 264/257; 264/324; 264/326
[58] Field of Search .................. 264/24, 26, 108, 136, 264/137, 257, 324, 326, 128; 204/164, 165, 168

[56] References Cited

U.S. PATENT DOCUMENTS

| 3,073,732 | 1/1963 | Hunsdiecker | 264/24 X |
| 3,497,419 | 2/1970 | Winer et al. | 264/24 X |
| 3,626,041 | 12/1971 | Fields et al. | 264/24 |
| 3,745,104 | 7/1973 | Hou | 204/164 |
| 3,767,505 | 10/1973 | Coran et al. | 264/24 X |
| 3,837,986 | 9/1974 | Gorter et al. | 264/108 X |
| 3,919,437 | 11/1975 | Brown et al. | 427/13 |
| 4,257,836 | 3/1981 | Beneze | 264/257 X |
| 4,298,562 | 11/1981 | Latty | 264/137 X |
| 4,328,324 | 5/1982 | Kock et al. | 204/165 X |
| 4,519,432 | 5/1985 | Schmidt et al. | 264/326 X |
| 4,707,231 | 11/1987 | Berger | 204/164 |

FOREIGN PATENT DOCUMENTS

| 2022164 | 12/1971 | Fed. Rep. of Germany. | |
| 3127017 | 1/1983 | Fed. Rep. of Germany. | |
| 2096585 | 2/1972 | France. | |
| 2379323 | 9/1978 | France. | |
| 2529215 | 12/1983 | France. | |
| 50-29939 | 9/1975 | Japan | 264/24 |
| 7214367 | 5/1973 | Netherlands | 264/137 |
| 780660 | 1/1978 | South Africa. | |
| 357301 | 12/1972 | U.S.S.R. | 264/108 |
| 816285 | 7/1959 | United Kingdom | 264/24 |

*Primary Examiner*—Jeffery Thurlow
*Assistant Examiner*—Leo B. Tentoni
*Attorney, Agent, or Firm*—Weingarten, Schurgin, Gagnebin & Hayes

[57] ABSTRACT

The present invention relates to a process for the preparation of a composite material wherein the element used to reinforce the composite material is subjected to an electrostatic field induced by a high voltage electric current, said element being then impregnated with a liquid matrix material or precursor of matrix, while still under the influence of said field, and to the composite materials obtained by carrying out said process, notably vulcanized products, in particular vehicle tires, ceramics and electrodes.

26 Claims, 1 Drawing Sheet

PROCESS OF MAKING A COMPOSITE PRODUCT, ESPECIALLY A VEHICLE TIRE

This is a continuation of Ser. No. 777,622 filed Sept. 19, 1985, now in part of U.S. Pat. No. 4,707,231.

FIELD OF THE INVENTION

The present invention relates to a process for preparing composite materials; it also relates to the intermediate or finished products which can be obtained with said process, notably vulcanized products, in particular tires, ceramics and electrodes.

BACKGROUND OF THE INVENTION

Composite materials are materials constituted of reinforcing elements (mostly fibers—or filaments—such as glass fibers, carbon fibers, boron or polyamide fibers, etc. . . .) and of a matrix (constituted either by a resin or a resistant material such as metal or ceramics).

The properties of composite materials are particularly dependent, as we know on:
—the orientation of the reinforcing elements;
—the good distribution of the matrix throughout the volume between the reinforcing elements;
—and of any bonds which may be induced between said reinforcing elements and said matrix.

SUMMARY OF THE INVENTION

It is therefore an advantage to use a technique wherein the above parameters can be worked in such a way as to optimize the properties of the product as a function of the aim in view, and this is precisely the object of the present invention.

To this effect, it has been unexpectedly found that composite materials of highly improved mechanical properties can be obtained when the reinforcing elements are subjected to an electrostatic field induced by a very high voltage current, and then impregnated with the liquid matrix, using the known techniques, while said elements are still under the influence of said field.

According to a first object, the invention provides a process for the preparation of a composite material that includes fibers used to reinforce the composite material comprising the steps of:

subjecting the fibers to an electrostatic field induced by a high voltage alternating electric current for a time interval sufficient to cause a modification of the surface of said fibers; and impregnating said fibers after the elapse of said time interval with a liquid matrix material or precursor of matrix, while still under the influence of said field, thereby consolidating bonding between the fibers and the matrix.

According to an advantageous embodiment, this process for the preparation of a composite material that includes fibers used to reinforce the composite material comprises the steps of:

subjecting the fibers to an electrostatic field induced by a high voltage direct electric current for a first time interval sufficient to cause charging said fibers;

subjecting the fibers to an electrostatic field induced by a high voltage alternating electric current for a second time interval sufficient to cause a modification of the surface of the fibers;

After the elapse of said two time intervals, impregnating said fibers with a liquid matrix or precursor of matrix, while still under the influence of said field, thereby consolidating bonding between the fibers and the matrix.

According to another embodiment, this process for the preparation of a composite material that includes fibers used to reinforce the composite material comprises the successive steps of:

subjecting the fibers to an electrostatic field induced by a high voltage alternating electric current for a first time interval sufficient to cause a modification of the surface of the fibers;

subjecting the fibers to an electrostatic field induced by a high voltage direct electric current for a second time interval sufficient to cause charging said fibers;

After the elapse of said two time intervals, impregnating said fibers with a liquid matrix or precursor of matrix, while still under the influence of said field, thereby consolidating bonding between the fibers and the matrix.

By high voltage current-induced electrostatic field is meant a field at least equal to the field obtained by applying between two electrodes 20 mm apart, a voltage equal to at least 20,000 volts in alternating current and to at least 40,000 volts in direct current. The reinforcing elements, and in particular the fibers, fibrils or roves used, are then positioned between the electrodes subjected to the very high voltage current.

According to the invention, any type of fibers can be used as reinforcing elements, but they must be of a dielectric material, namely a material which, when under the effect of the field, becomes electrically charged and remains charged for a certain time. This is the case for example with polyamide fibers (of NYLON or KEVLAR [generically termed "aramid"] type), glassfibers, fibers in certain metallic oxides, fibers in complex materials (metaloxide) and with carbon fibers. On the contrary, conducting fibers, such as for example metallic fibers or surface-metallized fibers are more difficult to use in the process according to the invention.

The reinforcing fibers are placed between the electrodes, and the very high voltage current is applied between said electrodes for a period long enough to charge said fibers, then, the charged fibers, taken out of the field, are impregnated with the matrix material or with a precursor of the matrix material, which is in liquid form.

The charged fibers having a tendency to push one another back, a bed of fibers is obtained at the output of the field, of which the thickness is between two and four times the thickness of the bed of fibers initially introduced between the electrodes, and it is when the fibers are in that "swollen" state that they should be impregnated.

Any one of the currently known and used matrix materials is suitable for the process according to the invention, for example resins (epoxy or polyamide) resins or hardened carbon mixtures) or silica-based mixtures capable of forming ceramics, and metals.

When the fibers have been impregnated by the liquid matrix material (or its liquid precursor), the resulting product can either be sold as is(normally after a first solidification) or it can be transformed by molding and solidification of the matrix. And as known, the matrix itself can be charged.

It has been found that with the process according to the invention, the reinforcing elements (fibers) become thoroughly impregnated by the matrix.

But it is also possible to bring to the process according to the invention certain particularly advantageous alterations.

If the electrostatic field is produced with a direct current, it is noted that, besides the swelling action of the bundle of initial fibers, there occurs a complementary orientation of said fibers. This orientation will permit the preparation of a composite material having specific properties.

It is also possible, as we know, to obtain that same orientation for certain fibers, by the simultaneous or prior use of another field such as for example a magnetic field.

If the electrostatic field is produced with an alternating current, it is noted that besides the swelling action of the bundle of fibers described hereinabove, localized discharges occur between the fibrils, causing, principally in the presence of oxygen, a modification of the surface of the fibers. This modification (which is probably an oxidation), stimulates the properties of the final material insofar as it makes it possible to obtain consolidated bonding between the fiber and the matrix.

It is conceivably possible, according to the invention, to use successively an A.C. electrostatic field (swelling and surface treatment) and a D.C. electrostatic field (swelling and orientation). A preferred embodiment comprises using first a D.C electrostatic field and secondly a A.C. electrostatic field.

The present invention according to a second object relates to a use of the above process for preparing composite materials with oriented reinforcing elements, to the vulcanization and production of tires, and also to the vulcanized products, in particular tires, obtained according to said process.

Indeed, it has been found that the application of this process causes unexpected effects during a vulcanization treatment, and that it was most advantageous for the production of tires and in particular radialply tires.

The present invention therefore relates to a use of the invention process such as above described to vulcanization, and in particular to the production of tires, such as radial-ply tires.

Conventionally, the production of tires calls on the use of fibers, such as polyamide fibers, glass fibers or plant fibers which are embedded in a matrix in elastomer, such as polyurethanes in natural and/or synthetic rubber, in rhodorsil, silicon, or thermoplastic elastomer, or in mixtures thereof.

In this particular application of the process described hereinabove, it has been found that the application of an A.C. type high voltage electrostatic field, causes a roughness of the fibers surface, thus radically and totally unexpectedly improving the surface bonding strength of the elastomer vulcanized on the surface of the fibers, thereby radically improving the mechanical properties of the vulcanized products and in particular of tires, such as radial-ply tires.

The present invention also relates to the vulcanized products obtained according to said process, such as tires, and preferably radial-ply-tires.

The present invention according to a third object relates to a use of the above process for the preparation of composite materials with oriented reinforcing elements, in the manufacture of ceramic composites and the ceramic composites obtained with said process.

It has now been unexpectely found that the use of said process could produce unexpected effects in the manufacture of ceramic composites and that it was therefore especially advantageous for the production of ceramic composites, whether of the ceramic-ceramic type or of the mixed ceramic and fibers type.

Indeed, the advantages of the ceramic materials lie in their mechanical strength, their resistance to very high temperatures, their resistance to corrosive agents, etc. and are wellknown. Yet, the weak point of all these ceramics is their brittleness. Attempts have then been made, to create ceramic composites imitating the known composites, but major difficulties have been encountered, particularly as regards the introduction of the matrix into the fibers, due to the viscosity of that matrix and to the interface bonding between matrix and fibers.

Now, the use of the invention process as above described has solved simultaneously all the aforesaid difficulties due to the fact that the electrostatic treatment process described in that patent enables the swelling of the fibers, which helps the introduction of the matrix, the orientation of the fibers which enables the use of long fibers necessary in order to obtain a good mechanical strength whereas the etching procures excellent interface bonding conditions.

It is therefore the object of the present invention to solve another technical problem by proposing a solution permitting the preparation of ceramic composites in which the introduction of the matrix into the fibers is simplified, and the interface bonding is excellent, and which also enables the use of long fibers necessary to obtain a good if not excellent mechanical strength.

This problem is now solved quite satisfactorily and for the first time by the present invention.

The present invention therefore relates to a use of the above said process using electrostatic fields in the production of ceramic composites of the ceramic-ceramic type or of the mixed ceramic and different fibers type.

One particular embodiment of the invention consists in producing a ceramic in which the ceramic matrix is of the zirconium type and the fibers are silicium carbide fibers, which are advantageously long fibers, woven or non-woven, the length of which is identical or near to the length of the piece to be produced.

Another particular embodiment of the invention consists in using alumina as ceramic matrix, the fibers being also in alumina and being advantageously long but non-woven fibers.

The present invention also covers the ceramic composites obtained according to said process.

As already indicated, it was found with the process described in the patent of which this disclosure is a continuation-in-part, that the fact of applying a high A.C. voltage electrostatic field, preferably immediately after applying a high voltage D.C. electrostatic field, was causing a roughness of the fibers surface, preferably after causing a swelling of said fibers, this improving radically, and quite unexpectedly, the impregnation of the fibers by the matrix and the bonding or interface adhesion between matrix and fibers, while improving radically the mechanical properties of the obtained ceramic composites.

The present invention according to a fourth object relates to a use of the above process for the preparation of composite materials with oriented reinforcing elements, in the production of electrodes, as well as the electrodes obtained according to said process and electrochemical generators equipped with such electrodes.

It has now been found, quite unexpectedly, that the use of the invention process has given totally unexpected results in the production of electrodes and that it was therefore especially advantageous for producing electrodes which can be used in electrochemical generators, such as accumulator batteries, primary cells, fuel cells, etc.

It is conventionally known that in any type of electrochemical generators, the efficiency is proportional to the ion exchange surface per unit of apparent surface. But if the aim is to obtain an advantageous weight-/mass-energy ratio, it is important for the ion working surface to be equal to the outer surface multiplied by a maximum coefficient. This has led to the production of electrodes in fiber form. A number of patents have already been filed on such production processes, among them : EP No. 22409; FR No.-863 970; FR No.-995 222; FR No.-1 598 370; FR No.-2 489 788; DE No.-1 671 761; DE No.-1 915 859; DE No.-2 407 444; U.S. Pat. No. 2,616,165; U.S. Pat. No. 3,375,136 and also GB No.-2 055 899.

But the electrodes produced according to these methods have a relatively poor lamination resistance because of the poor quality interface bonding between active material and conducting fibers. Moreover, the active surface/apparent surface ratio is relatively low and has to be improved in order to improve efficiency.

It is the object of the present invention to solve this new technical problem with a solution permitting the production of electrodes with an excellent interface bonding between the active material and the conducting fibers, thus improving radically the mechanical properties of said electrodes, and with a very large active surface for a small apparent surface, thereby improving radically the efficiency of said electrodes. The solution proposed is also meant to be particularly simple.

Such a problem has now been satisfactorily and unexpectedly solved in a particularly simple way by the present invention.

Accordingly, the present invention further relates to a use of the invention process as above described in the manufacture of electrodes as well as those electrodes.

Among suitable fibers according to the invention, it is obviously important to use fibers capable of receiving, by electrolytic deposition, negative active materials for producing the anodes, or positive active materials for producing cathodes, therefore said fibers will have to be either conducting or made to be conducting by metal deposition, such as for example of "electroless" type.

According to the invention, carbon or boron fibers are preferably used as conducting fibers, the preferred ones being graphite fibers, and advantageously in the form of weaves of fibers, cut to the size of the electrodes to be produced.

According to a particular embodiment of the invention, negative electrodes are produced by deposition of a metal selected from the group consisting advantageously of zinc, lithium, magnesium, cadmium.

According to yet another embodiment of the invention for producing negative electrodes, it is preferably proceeded to a deposition of manganese dioxide, nickel oxide, silver dioxide, titanium dioxide.

In this particular application or utilization of the process described in patent of which this disclosure is a continuation -in-part, it has been found that the fact of applying a high voltage A.C. electrostatic field roughens the surface of the fibers, said A.C. field being preferably applied after the application of a high voltage D.C. electrostatic field which causes the swelling and alignment of the fibers, thus radically and unexpectedly improving the penetration of the active material into the fibers, and giving an excellent interface bonding between active material and fibers, and most unexpectedly, a very large active surface for a small apparent surface.

The invention also covers the electrodes obtained according to said process as well as the electrochemical generators equipped with such electrodes, namely accumulator batteries, primary cells, fuel cells, etc.

BRIEF DESCRIPTION OF THE DRAWINGS

The invention will be more readily understood on reading the following description of a non-restrictive example, with reference to the accompanying FIGS. 1 to 9, and invention examples.

Referring first to FIG. 1, this shows a casing in insulating material 1 resting on insulating support members 2, and containing, in position between wedge members 3 and resting on an insulating base 4 : a first plate-shaped lower electrode 5, a first dielectric 6, a gap 7, a second dielectric 8 and a second, equally plate-shaped electrode 9. The fibrous bundle 10 is placed between the two dielectrics. The two electrodes 5 and 9 are connected to a generator of direct current of voltage about 100,000 volts. The assembly is charged for about 10 mins. for fibrils of between 5 and 6 mm thickness. FIG. 2 shows the bundle before being charged, and FIG. 3 shows the bundle after a 10-minute charging treatment.

It is found after successive experiments that the volume has virtually doubled, hence, doubling the volume between the fibrils, the actual volume of the fibrils remaining unchanged.

Figure 1:
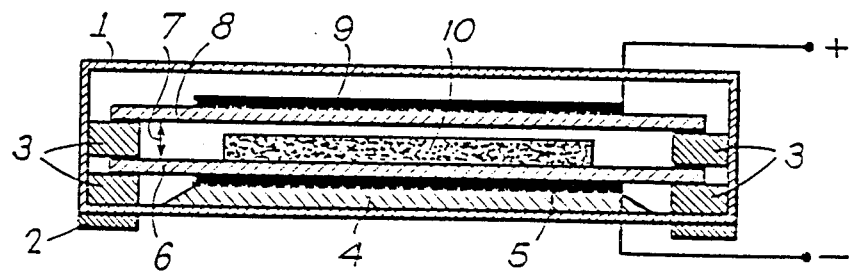
FIG. 1 is a sectional view illustrating an exemplary apparatus useful in explaining the method of the instant invention.
Figure 2:
FIG. 2 is a fragmentary, schematic diagram illustrating a fiber bundle before treatment in the FIG. 1 apparatus in accordance with the method of the invention.
Figure 3:
FIG. 3 is a fragmentary, schematic diagram illustrating the same fiber bundle of FIG. 2 after treatment in the FIG. 1 apparatus in accordance with one aspect of the method of the instant invention.
Figure 4:
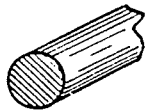
FIG. 4 is a fragmentary view of a single fibril of the fiber bundle of FIG. 2.
Figure 5:
FIG. 5 is a schematic, fragmentary diagram illustrating a fibril of the fiber bundle of FIG. 3.

FIG. 4 shows a microscopic view of a fibril before the treatment, and FIG. 5 shows the same fibril as found after the treatment.

Figure 6:
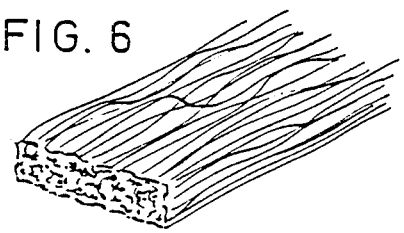
FIG. 6 is a fragmentary schematic view illustrating a disordered fiber bundle before treatment in the FIG. 1 apparatus in accordance with another aspect of the inventive method.
Figure 7:
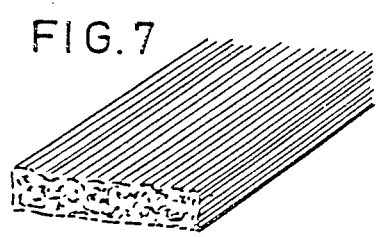
FIG. 7 is an ordered fiber bundle that results after treatment in the FIG. 1 apparatus in accordance with that aspect of the inventive method.

From a practical standpoint, it has been found that the fact of subjecting the whole bundle of fibrils to a first A.C. field in order to obtain a more efficient etching with alternating current, and then subjecting it to a D.C. field in order to create an expansion, greatly contributes to obtaining a ground, expanded and tidy bundle. Indeed, a third effect noted is that a rather disorderly bundle, such as illustrated in FIG. 6, becomes perfectly orderly after a treatment in a high voltage D.C. electrostatic field, as illustrated in FIG. 7.

Figure 8:
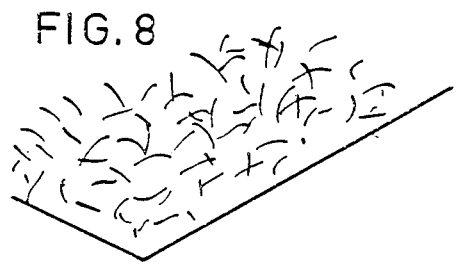
FIG. 8 is a partial, schematic diagram illustrating short, randomly oriented, inhomogeneous fibers prior to treatment in the FIG. 1 apparatus in accordance with a further aspect of the instant invention.
Figure 9:
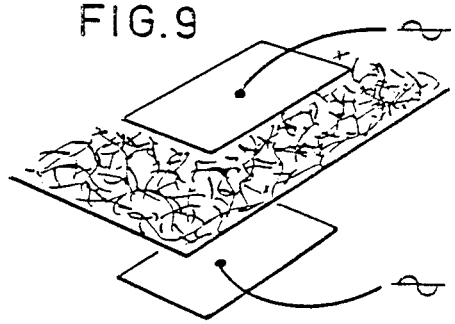
FIG. 9 is a schematic, partial diagram illustrating the same short, randomly oriented fibers that are more homogeneous after treatment in the FIG. 1 apparatus in accordance with the inventive method.

Another application, this time using A.C. voltage, consists in injecting short fibers between the two electrodes, as illustrated in FIG. 8 and subjecting them to a high voltage A.C. field, as illustrated in FIG. 9. It is found then that a bundle of short fibers is obtained in which the fibers are arranged somewhat randomly but homogeneously, which is very advantageous in the case of short fiber composites, since sequencing always gives breaking points, hence weak points.

EXAMPLE 1

Woven Kevlar (aramid) fibers are placed between the plates of an electrostatic field generating device, which plates can be fed with a high voltage alternating or direct current.

First of all a high voltage direct current of at least 40,000 volts is applied to said plates for a few minutes in order to separate the fibers and to obtain a swelling thereof, the overall thickness of the fibers then reaching between two and four times the thickness of the bed of fibers initially introduced between the plates forming electrodes, as above described Then, on alternating current at a voltage of preferably at least 20,000 volts is applied for a few minutes, in order to obtain a roughness of the fibers surface due to an etching effect created on the surface by localized discharges when the electrostatic field is modified by reversing the polarity of the electric field.

While the Kevlar (aramid) fibers are still under the influence of the electrostatic field, said fibers are embedded in a polyurethane elastomer which may contain one or more of the conventional vulcanizing agents, such as sulphur, in a relative proportion of 40% by weight of Kevlar (aramid) fibers and 60% by weight of polyurethane elastomer.

Then it is proceeded with the conventional vulcanizing treatment which may comprise a shaping in order to obtain a tire. To this end, the process may be carried out so as to obtain a radial-ply tire in a quite conventional way.

The resulting vulcanized product is found to have mechanical properties which are radically improved over the conventionally vulcanized products which have not been submitted to the process described in the main patent namely through a treatment by a high voltage A.C. or D.C. electric field.

EXAMPLE 2

The procedure is the same as in Example 1, except that the fibers used are KEVLAR (aramid) type polyamide fibers woven at 60% lengthwise and at 40% widthwise. These fibers are subjected for 10 minutes to a direct current of 100,000 V, then for 15 minutes to an alternating current of 25,000 V. Each one of these two electrostatic treatments consisting in causing first a stream of hot air at 90° C. followed by a stream of hotter air, at more than 100° C., for example around 130° C., to flow between the plates, then the treated fibers are impregnated, while still under the influence of an electrostatic discharge, with a soft matrix composed of a polyurethane elastomer containing an adhesive bond constituted by a phenolic resin of the "Rhône-Poulenc" A.R.P. 27 type.

The resulting material is then put under a pressure of 2 t/dm2 and baked by polymerisation at 140° C. for four hours, then heating is stopped and the resulting product is allowed to cool for 24 hours.

The resulting vulcanized elastomer can be used as vehicle tire and is found to have the following characteristics :

Characteristics :

- Density: 2.35
- Color: dark grey
- Maximum temperature of use: 150° C.
- Fibers-matrix delamination: None after 10,000 helical twistings.

The matrix used here may be replaced for example by natural rubber.

It is also possible for various applications to obtain the same supple products with pre-treated vegetable fibers (such as for example, fibers pretreated in phenol-based solutions).

Tests conducted in laboratories have given excellent results with flax and hemp fibers.

The swelling and pigmentation reaction obtained in electrostatic fields is particularly advantageous, because the swelling effect is such that the "blotting effect" permits instant absorption of the different matrices with which said fibers may have been mixed.

EXAMPLE 3

Long woven fibers in silicium carbide, such as for example of the MITSUI "Micalon" type, are placed between the plates of an electrostatic field generating device, which plates can be supplied with a high A.C. or D.C. voltage.

Said fibers are then subjected to a treatment by the electrostatic process described in the main patent 84 14800, preferably conducted as follows :

- first a high D.C. voltage of at least 40,000 volts is applied to the plates, preferably 100,000 volts, for a few minutes, preferably 10 minutes, so as to space out the fibers and cause them to swell, the thickness of the fibers assembly then reaching between two and four times the thickness of the bed of fibers initially introduced between the plates forming electrodes, as described in the main patent.

Preferably, an A.C. voltage at least equal to 20,000 volts, and preferably around 25,000 volts is then applied for a few minutes, preferably about 10 minutes, in order to obtain a roughness of the fibers surface by a stripping effect on the surface, or by etching, resulting from localized discharges when the electrostatic field is modified by reversing the polarity of the electric field.

This treatment of the fibers is advantageously carried out under a stream of hot air heated to a temperature exceeding 100° C., and preferably equal to about 130° C.

Then while the silicium carbide fibers are still under the effect of the electrostatic field, the silicium carbide fibers are coated with a ceramic matrix which in this case is preferably composed of $ZrO_2$ (70% by weight) and of $SiO_2$ (30% by weight), which matrix can contain an adhesive binder and, advantageously, an activating binder, in the relative proportion given hereunder, in % by weight :

|  | % by weight |
| --- | --- |
| Ceramic matrix: | |
| ZrO$_2$ (70% by weight) | |
| SiO$_2$ (30% by weight) | 50 |
| Adhesive binder, type 940 A from "Cotronics" | 20 |
| Adhesive binder type 940 T from "Cotronics" | |
| Long woven silicium carbide fibers | |
| type "Nicalon" MITSUI | 30 |

Then it is proceeded to the baking operation, as follows :
- a first baking in a conventional oven for two hours, using the ambient air heated up to 80° C.;
- then the heating is turned off, and the product is left to rest for 24 hours ;
- a second baking operation is then conducted in the same conventional oven using ambient air, by raising the temperature progressively 150° C. every hour, until a temperature of 1050° C. is reached ;
- the heating is then turned off and the product is cooled slowly for 24 hours ;
- finally a third baking operation is conducted for fritting purposes ;
- said third baking operation is conducted in an oven with a neutral or reducing atmosphere, such as for example Xenon or H$_2$. Thereagain, the temperature is raised progressively 150° C. every hour, for two hours ;
- the heating is then turned off and the product is cooled slowly for 24 hours.

The ceramic composites prepared in this way, which are known as of the "zirconia-silicium carbide" type, exhibits the following characteristics :
- Density 2.7
- Color : pinkish-white
Maximum temperature of use : 1,800° C.
- Water regain : none
- Modulus in the flexure : 160 G.Pa
- Modulus of rupture : 860 M.Pa
- Elongation : 0.47
- Mechanical strength towards vibrations : between 0 and 60 KHz.

It is clear from these test results that the characteristics of the ceramic composites obtained with the electrostatic process are quite exceptional, which constitutes an undeniable technical progress, particularly unexpected for any one skilled in the art.

EXAMPLE 4

The procedure is the same as in Example 1, but using alumina as matrix and long non-woven fibers of alumina of SUMITOMO type as fibers.

As adhesive binder, the matrix contains an adhesive binder such as of "CONTRONICS" RTC 70 type, the relative proportions being the same as in Example 1.

The ceramic composite material thus obtained exhibits the following characteristics :
- Density : 2.2
- Color : white
- Maximum temperature of use : 1,700° C.
- Modulus of flexure : 140 G.Pa
- Modulus of rupture : 720 M.Pa
- Elongation : 0.38

As already indicated, the invention also covers the ceramic composites obtained according to said process. Therefore, the two examples given hereinabove form an integral part of the invention.

It should be noted that, according to the invention, by long fibers is meant fibers of which the length is not preset. Advantageously, the length of these fibers is adapted to the length of the piece to be produced. Thus, the length of the fibers is normally chosen to be either identical or near to the length of the piece. There is therefore no restriction of size for the fibers, contrary to what was the case in prior art processes. This then constitutes a partcularly unexpected advantage of the present invention.

The fibers used as reinforcing elements may be of different types without departing from the scope of the invention. Advantageously they may be in silicium carbide, boron, alumina, carbon and polyamides, in any forms.

The matrix may also be different type provided that it leads to the formation of a ceramic type material. It will advantageously be a matrix of ZrO$_2$; ZrO$_2$SiO; SiO$_2$; Al$_2$O$_3$; SiO$_2$Al$_2$O$_3$; LiO; TiO$_2$; ZnO; MnO; CaO; CeO$_2$; MgO$_5$; Al$_2$TiO$_5$; NiSiO$_2$ and mixtures thereof in all proportions.

EXAMPLE 5

Production of a negative electrode (anode) for use in zinc-nickel accumulator batteries.

A first step consists in cutting elements from a weave of graphite fibers, to the size of the electrodes.

These cut fibers, in woven form, are then placed between the plates of an electrical field generating device, which plates can be fed with a high A.C. or D.C. voltage.

First, the plates receive for a few minutes, preferably about 15 minutes, a high-voltage direct current of at least 40,000 V, preferably around 100,000 V, for spacing and swelling up the fibers, the thickness of the fibers assembly then reaching between two and four times the thickness of the bed of fibers initially introduced between the plates forming electrodes.

Then, preferably, an alternating current at least equal to 20,000 V, and preferably to 25,000 V, is applied for a few minutes, preferably 15 minutes, in order to obtain a roughness of the fiber surface by surface stripping effect, or etching, resulting from localized discharges when the electrostatic field is modified by reversing the polarity of the electric field.

These two treatments by an electrostatic field are preferably conducted after heating the fibers in an oven, at about 350° C., said treatments being conducted by causing a stream of hot air to pass between the plates at a temperature of about 150° C.

In order to obtain a perfect electrical conductibility, another step consists in placing on each side of a metal grid in stainless steel, such as of the GANTOIS R 0.25 type, a bulky and treated weave, then still under the effect of the electrostatic field, and coating these weaves with a view to bonding them, with a conducting adhesive forming matrix, such as for example an M.Ag type conducting adhesive, sold by the company 3M.

Said adhesive having been left to test as prescribed in the notice of use thereof, it is then proceeded, in an electrolytic bath, to the deposition of a metal, in this case zinc, on the swollen and etched fibers, according to the following method.

The electrolytic bath is prepared as follows, for 2 l of solution :
-First 200 g of gluconate are dissolved in one liter of distilled water ;

- then 50 g of zinc chloride are dissolved in the resulting solution;
- and about 15 cm3 of a solution sold under the reference 9211-WH by Ets. Walberg are added thereto;
- the solution is completed with 2 l of distilled water, and
- the pH of the obtained solution is brought to between 2 and 5.5 with KoH.

It should be noted that the electrolytic bath solution can be used several times on condition that 20 g of gluconate are added in after each filtration, said gluconate being preferably sodium gluconate.

Electrolytic deposition of zinc is performed conventionally, a slight stirring being kept up throughout the deposition. The intensity is preferably under 7 A.

In the case where the intensity is below 7 A, it suffices to clean the zinc plates every two hours, whereas if the intensity is higher than 7 A, the zinc plates must be cleaned every hour.

After proceeding to a deposition of 3 hours, it is proceeded to a rinsing and drying, then the obtained plate is compressed at the rate of 3 t per dm2, to obtain a porous electrode of very high capacity with an ion working surface multiplied by 30 or 40 compared with the currently used electrodes, this fact constituting a totally unexpected technical result.

The same process can be used in particular to produce anodes in zinc, in cadmium, in lithium, in magnesium, as well as to produce cathodes in nickel, in silver, in cobalt, in titanium and in manganese.

Similarly, with cells, it is possible with the invention to obtain an excellent deposition of manganese dioxide, whereas if such an electrode is produced in wound-band form, the tests conducted to-date have shown that it is possible to constitute a very conducting cathode in which the $MnO_2$-graphite ratio is 75% of $MnO_2$ for only 25% of conducting material, which is a remarkable achievement.

Thus, the obtained cathode is found to have a considerably higher mechanical strength which is a great improvement over the conventional $MnO_2$ as well as alkaline or salin cells, and an active material—inert material ratio increased in the proportion of 30%.

These results are due to the swelling of the fibers, by the electrostatic treatment with a direct current, which enables the fibers to admit a large quantity of active material, and to the etching obtained with the alternating current electrostating treatment, which procures good interface bonding between fibers and matrix, hence a perfect electrical conductibility.

Conceivably therefore, the invention corresponds to an important technical progress which was totally unexpected for any one skilled in the art.

What is claimed is:

1. A process for the manufacturer of a vulcanized composite material having improved mechanical and wear properties, the composite material having reinforcing fibers that reinforce a vulcanizable matrix, comprising the steps of:
   subjecting the fibers in a dry state to an electrostatic field that is induced by a high-voltage electric current to prepare the fibers to be impregnated;
   impregnating said fibers with a vulcanizable liquid matrix or precursor of a vulcanizable matrix while still under the effect of said electrostatic field thereby consolidating bonding between the fibers and the matrix; and
   vulcanizing the impregnated fibers/matrix composite, thereby obtaining said vulcanized composite material.

2. The process of claim 1, wherein said electrostatic field includes time sequential first and second fields that are induced by high voltage electric currents.

3. The process of claim 2, wherein one of said fields is induced by an A.C. electric current an where the other of said fields is induced by a D.C. electric current.

4. The process of claim 1, wherein the first of said fields is induced by D.C. electric current and the second one of said fields is induced by A.C. electric current.

5. The process of claim 1, further including the step of shaping the impregnated fibers/matrix composite into a vehicle tire to obtain a vehicle tire as the vulcanized composite material.

6. The process of claim 1, wherein the fibers used as reinforcing elements are selected from the group consisting of polyamide fibers, plant fibers and glass fibers.

7. The process of claim 1, wherein the matrix is selected from the group consisting of polyurethane elastomer, natural rubber, synthetic rubber, rhodorsil, silicon, thermoplastic elastomer, and mixtures thereof.

8. The process of claim 6, wherein the matrix is selected from the group consisting of polyurethane elastomer, natural rubber, synthetic rubber, rhodorsil, silicon, thermoplastic elastomer, and mixtures thereof.

9. The process of claim 1, wherein woven (aramid) fibers as reinforcing fibers are used with polyurethane elastomer as matrix, the relative proportion being about 40% by weight of woven (aramid) fibers with about 60% by weight of polyurethane elastomer.

10. The process of claim 4 wherein the D.C. electric current is about 40,000 V D.C. electric current and wherein the A.C. electric current is about 20,000 V electric current.

11. The process of claim 1, wherein the D.C. electric current is about a 100,000 V D.C. electric current and wherein the A.C. electric current is about a 25,000 V electric current.

12. The process of claim 1, wherein said fibers are of a dielectric material.

13. The process of claim 12, wherein said dielectric material is selected from the group consisting of polyamide fibers, glass fibers, metallic oxide fibers, carbon fibers and mixtures thereof.

14. A process for the manufacturer of a composite material usable as a vehicle tire having improved mechanical and wear properties, the composite material having tire reinforcing fibers that reinforce a tire matrix, comprising the steps of:
   subjecting the fibers in a dry state to an electrostatic field that is induced by a high-voltage electric current to prepare the fibers to be impregnated;
   impregnating said fibers with a liquid matrix or precursor of a matrix while still under the effect of said electrostatic field thereby consolidating bonding between the fibers and the matrix; and
   vulcanizing the impregnated fibers/matrix composite, so that the resulting vulcanized material is usable as a vehicle tire.

15. The process of claim 14, wherein said electrostatic field includes time sequential first and second fields that are induced by high voltage electric currents.

16. The process of claim 15, wherein one of said fields is induced by an A.C. electric current and where the other of said fields is induced by a D.C. electric current.

17. The process of claim 14, wherein the first of said fields is induced by D.C. electric current and the second one of said fields is induced by A.C. electric current.

18. The process of claim 14, further including the step of shaping the impregnated fibers/matrix composite into a vehicle tire.

19. The process of claim 14, wherein the fibers used as reinforcing elements are selected from the group consisting of polyamide fibers, plant fibers and glass fibers.

20. The process of claim 14, wherein the matrix is selected from the group consisting of polyurethane elastomer, natural rubber, synthetic rubber, rhodorsil, silicon, thermoplastic elastomer, and mixtures thereof.

21. The process of claim 19, wherein the matrix is selected from the group consisting of polyurethane elastomer, natural rubber, synthetic rubber, rhodorsil, silicon, thermoplastic elastomer, and mixtures thereof.

22. The process of claim 14, wherein woven (aramid) fibers as reinforcing fibers are used with polyurethane elastomer as matrix, the relative proportion being about 40% by weight of woven (aramid) fibers with about 60% by weight of polyurethane elastomer.

23. The process of claim 17, wherein the D.C. electric current is about 40,000 V D.C. electric current and wherein the A.C. electric current is about 20,000 V electric current.

24. The process of claim 17, wherein the D.C. electric current is about a 100,000 V D.C. electric current and wherein the A.C. electric current is about a 25,000 V electric current.

25. The process of claim 14, wherein said fibers are of a dielectric material.

26. The process of claim 25, wherein said dielectric material is selected from the group consisting of polyamide fibers, glass fibers, metallic oxide fibers, carbon fibers and mixtures thereof.

* * * * *

UNITED STATES PATENT AND TRADEMARK OFFICE
CERTIFICATE OF CORRECTION

PATENT NO. : 4,857,244
DATED : August 15, 1989
INVENTOR(S) : Michel Berger It is certified that error appears in the above-identified patent and that said Letters Patent is hereby corrected as shown below:

In the Abstract, 9th line, "particular vehicle tires, ceramics and electrodes" should read --particular, vehicle tires--.

In Column 6, line 46, insert title, --DETAILED DESCRIPTION OF THE EXEMPLARY EMBODIMENTS--.

In Column 7, line 30, "on alternating" should read --an alternating--.

In Column 9, line 36, "Density 2.7" should read --Density: 2.7--.

In Column 12, line 8, "current an where" should read --current and where--.

In Column 12, line 28, "woven (aramid)" should read --woven aramid--.

In Column 12, line 31, "woven (aramid)" should read --woven aramid--.

In Column 12, line 34, "about 40,000" should read --about a 40,000--.

In Column 12, line 35, "about 20,000" should read --about a 20,000--.

UNITED STATES PATENT AND TRADEMARK OFFICE
CERTIFICATE OF CORRECTION

PATENT NO. : 4,857,244
DATED : August 15, 1989
INVENTOR(S) : Michel Berger It is certified that error appears in the above-identified patent and that said Letters Patent is hereby corrected as shown below:

In Column 12, line 37, "claim 1," should read --claim 4--.

In Column 13, line 18, "woven (aramid)" should read --woven aramid--.

In Column 14, line 2, "woven (aramid) should read --woven aramid--.

In Column 14, line 5, "about 40,000" should read --about a 40,000--.

In Column 14, line 6, "about 20,000" should read --about a 20,000--.

Signed and Sealed this

Eighteenth Day of August, 1992

*Attest:*

DOUGLAS B. COMER

*Attesting Officer*     *Acting Commissioner of Patents and Trademarks*